United States Patent
Waters et al.

(10) Patent No.: US 8,612,146 B2
(45) Date of Patent: Dec. 17, 2013

(54) ACCELEROMETER-AIDED GYROSCOPE

(75) Inventors: Deric W. Waters, Dallas, TX (US); Tarkesh Pande, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 222 days.

(21) Appl. No.: 13/023,987

(22) Filed: Feb. 9, 2011

(65) Prior Publication Data

US 2012/0158296 A1 Jun. 21, 2012

Related U.S. Application Data

(60) Provisional application No. 61/304,673, filed on Feb. 15, 2010.

(51) Int. Cl.
*G01C 21/10* (2006.01)

(52) U.S. Cl.
USPC ............. 701/509; 701/507; 702/96; 702/141; 702/145

(58) Field of Classification Search
USPC ......... 702/96, 141, 145, 151; 623/10; 907/62; 701/509, 2, 37; 178/18.01; 340/539.11; 345/173, 179; 356/459
See application file for complete search history.

(56) References Cited

U.S. PATENT DOCUMENTS

| | | |
|---|---|---|
| 2009/0069987 A1 | 3/2009 | Omelchenko et al. |
| 2009/0326851 A1 * | 12/2009 | Tanenhaus .................. 702/96 |
| 2012/0150294 A1 * | 6/2012 | Weinberg et al. ............ 623/10 |

* cited by examiner

*Primary Examiner* — Behranig Badii
(74) *Attorney, Agent, or Firm* — Steven A. Shaw; W. James Brady, lll; Frederick J. Telecky, Jr.

(57) ABSTRACT

A system comprises a gyroscope configured to produce a gyroscope signal, an accelerometer configured to produce an accelerometer signal, and a filter unit coupled to the gyroscope and having a configurable bandwidth. The filter unit configured to filter the gyroscope signal. The system also comprises control logic that is configured to alter the bandwidth of the filter unit based on the accelerometer signal.

7 Claims, 6 Drawing Sheets

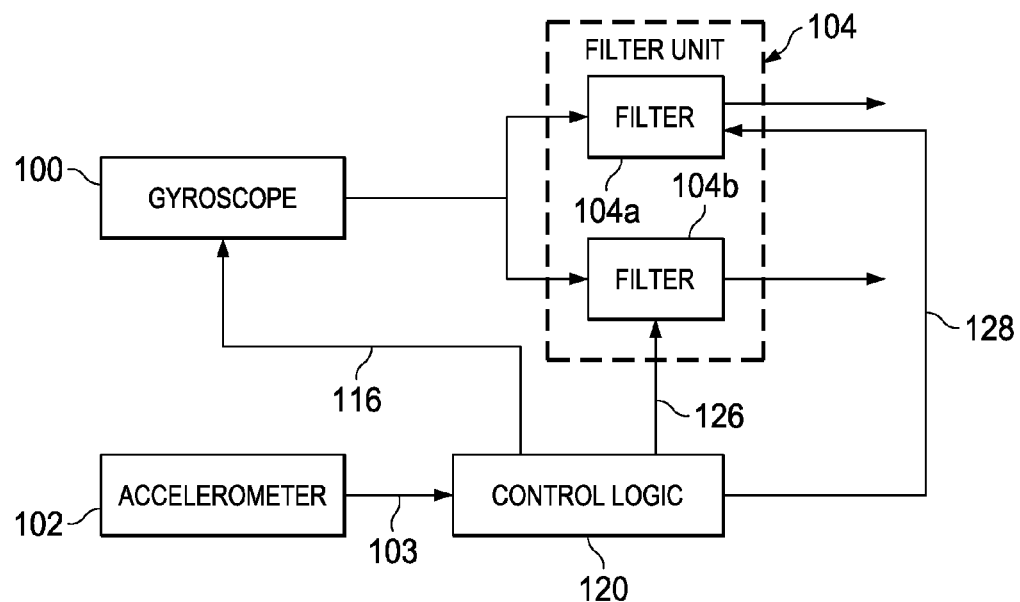
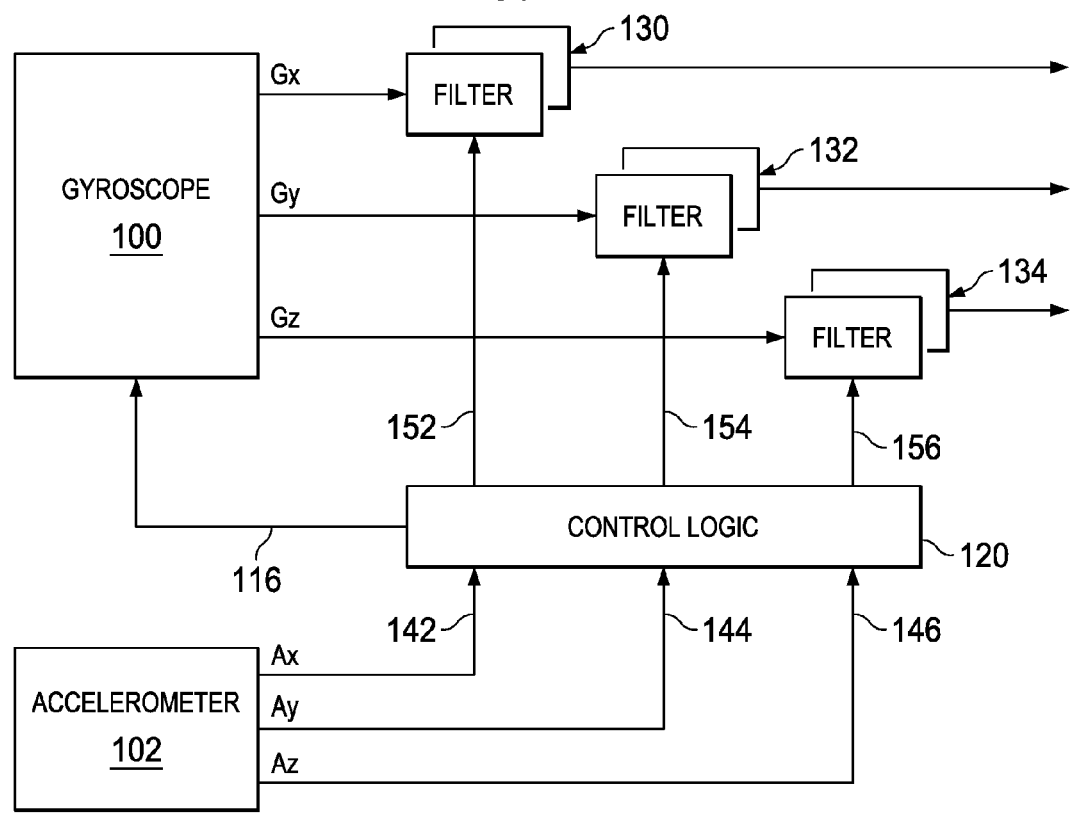

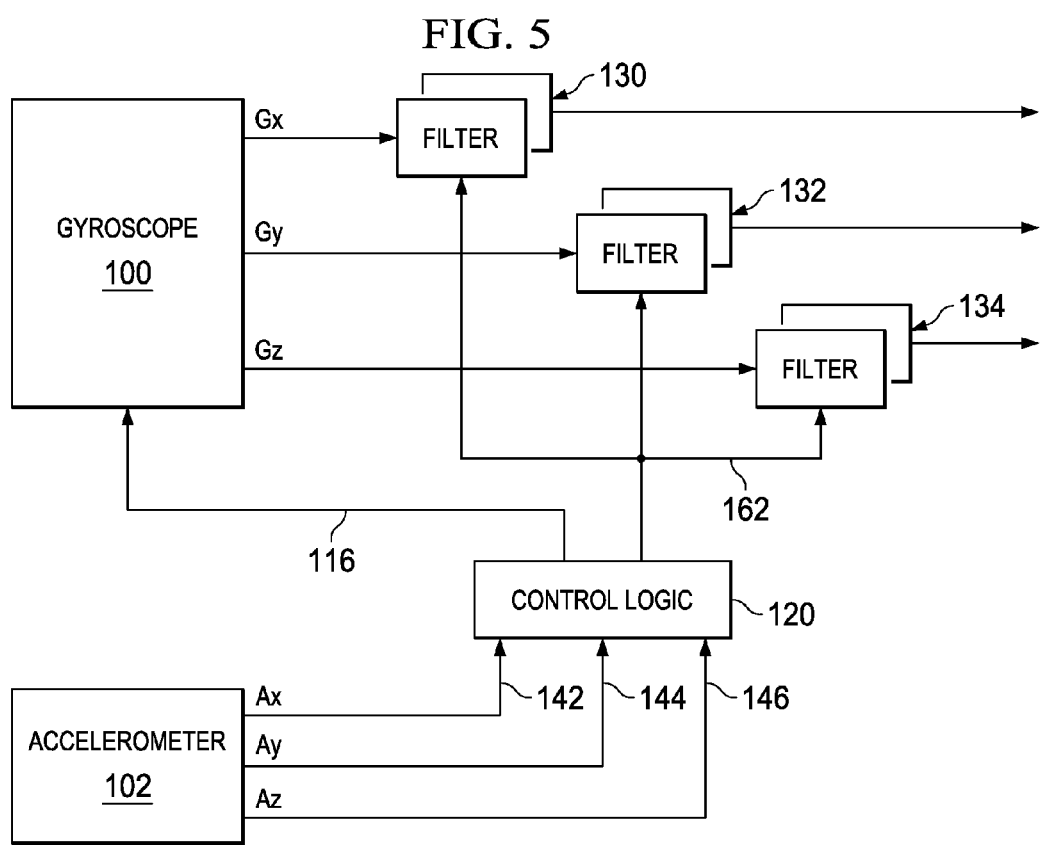

ACCELEROMETER-AIDED GYROSCOPE

CROSS-REFERENCE TO RELATED APPLICATIONS

The present application claims priority to U.S. Provisional Patent Application No. 61/304,673, filed on Feb. 15, 2010; which is hereby incorporated herein by reference.

BACKGROUND

Some navigation systems are based on signals received from orbiting satellites, such as the Global Positioning System (GPS) satellites. Performance of such systems degrades if the receiver does not have a direct line-of-sight to the orbiting satellites. Performance of such satellite-based systems degrades if the signal from the satellite is blocked such as by buildings, mountains, etc.

Navigation assistance devices are used in concert with the satellite based systems to provide continued navigation capability when satellite visibility is poor due to the absence of a line-of-sight to the satellite. For example, gyroscopes and accelerometers can be used to help determine displacement or relative position. The combination of gyroscopes and accelerometers can provide heading rate measurements which provide information about the rate of change of the heading (e.g., a vehicle making a turn on a road).

In practice, however, noise is present in both the accelerometer and gyroscope outputs. Such noise unfortunately limits the amount of time a reliable position estimate can be provided without the need for recalibration, for example, via satellite signals. The position estimate's "drift" from the true position is mainly caused by errors in attitude computation which in turn is based on the gyroscope's outputs.

Generally low cost gyroscopes and accelerometers are based on Micro-electrical mechanical sensors (MEMS) technology. In current MEMS-based inertial navigation systems, errors in the attitude are the limiting factor for the amount of dead-reckoning that can be performed.

SUMMARY

The problems noted above are solved in large part by an inertial navigation system that, in some embodiments, comprises a gyroscope, filter, an accelerometer and control logic. The control logic dynamically configures the filter's bandwidth setting based on the accelerometer's signal. The inertial navigation system may be handheld and thus portable or affixed to a vehicle.

In accordance with at least some embodiments, a system comprises a gyroscope configured to produce a gyroscope signal, an accelerometer configured to produce an accelerometer signal, and a filter unit coupled to the gyroscope and having a configurable bandwidth. The filter unit configured to filter the gyroscope signal. The system also comprises control logic that is configured to alter the bandwidth of the filter unit based on the accelerometer signal.

In accordance with other embodiments, a system comprises a gyroscope configured to produce a gyroscope signal and a filter unit coupled to the gyroscope and having a configurable bandwidth. The filter unit configured to filter the gyroscope signal. The system also comprises control logic that is configured to alter the bandwidth of the filter unit based on an accelerometer signal from an accelerometer.

Other embodiments are directed to a method comprising setting a bandwidth of a gyroscope filter based on an accelerometer signal and filtering, by the gyroscope filter, a signal from a gyroscope.

BRIEF DESCRIPTION OF THE DRAWINGS

For a detailed description of exemplary embodiments of the invention, reference will now be made to the accompanying drawings in which:

FIG. 3 shows another system embodiment in which the filter unit comprises multiple filters;

FIGS. 4 and 5 show systems comprising three-axis sensors and corresponding filters for the gyroscope;

NOTATION AND NOMENCLATURE

Figure 1:
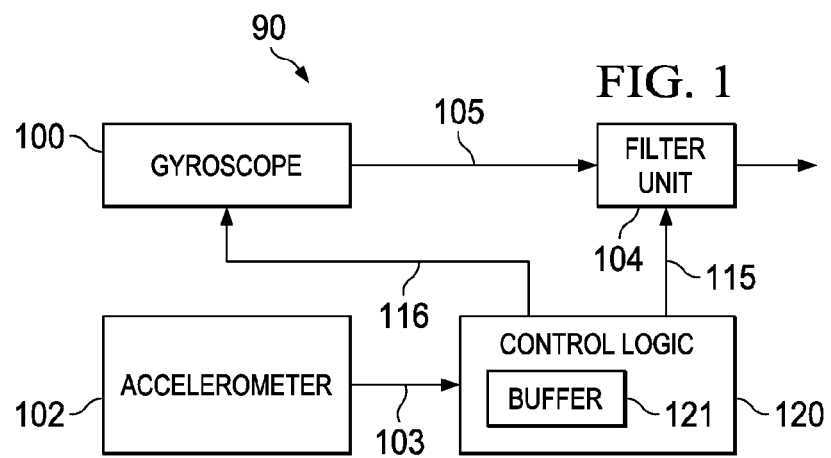
FIG. 1 shows a system in accordance with a preferred embodiment.

Certain terms are used throughout the following description and claims to refer to particular system components. As one skilled in the art will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect or direct electrical connection. Thus, if a first device couples to a second device, that connection may be through a direct electrical connection, or through an indirect electrical connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As shown, the inertial navigation system 90 comprises a gyroscope 100 and an accelerometer 102. The output signal 105 from the gyroscope 100 is provided to a filter unit 104 and the output signal 103 from the accelerometer is provided to control logic 120. Based on the accelerometer signal 103 from the accelerometer 102, the control logic 120 generates a control signal 115 to the filter unit 104. In at least some embodiments, the control logic 120 may also generate an enable signal 116 to turn on and off the gyroscope 100 based on the accelerometer signal 103.

The filter unit 104 preferably comprises a low-pass filter and preferably has a configurable bandwidth. As a low pass filter, the cut-off frequency of the filter unit's frequency response is adjustable. For example, the bandwidth can be altered through the selection of different filter coefficients. In the filter equation filtered accel[n]=alpha*a[n]+(1−alpha)*filltered accel[n−1]

alpha is a coefficient that can be changed to implement different filter bandwidths/cut-off frequencies. A[n] is the current accelerometer signal and filtered accel[n−1] is the previous filtered accelerometer signal value.

The filter unit 104 is configured to filter the gyroscope's output signal 105. In accordance with the preferred embodiments of the invention, the magnitude of the signals from the accelerometer is assessed and used to determine an appropriate bandwidth setting for the filter unit 104. For example, a threshold can be pre-programmed into control logic 120 or programmed by a user during run-time, and if the accelerometer signal exceeds that threshold, then the control logic causes the filter unit 104 to implement a higher bandwidth (i.e., higher cut-off frequency). If the accelerometer signal is below the threshold, then the control logic causes the filter unit 104 to implement a lower bandwidth (i.e., lower cut-off frequency). Thus, two different bandwidths can be set for the filter unit 104 based on the amplitude of the accelerometer signal. In some embodiments, the threshold implements hysteresis and thus comprises two different thresholds—a higher threshold and a lower threshold. Exceeding the higher threshold causes a higher bandwidth to be configured in the filter unit 104 and dropping below the lower threshold causes a lower bandwidth to be used.

In some embodiments, the inertial navigation system 90 is, or is implemented as part of, a handheld device (e.g., a smart phone, PDA, etc.). Further, the inertial navigation system may be docked or otherwise attached to a support structure (e.g., carrier) attached to a vehicle such as car, truck, etc. The gyroscope 100 and accelerometer in such embodiments thus are part of the handheld device which may or may not be affixed to the vehicle. If affixed to the vehicle, the inertial navigation system 90 monitors and detects the motion of the vehicle. If carried by a user outside of a vehicle, the inertial navigation system 90 monitors and detects the motion of the user himself. For example, the inertial navigation system is usable to detect a walk profile of the user.

Figure 2:
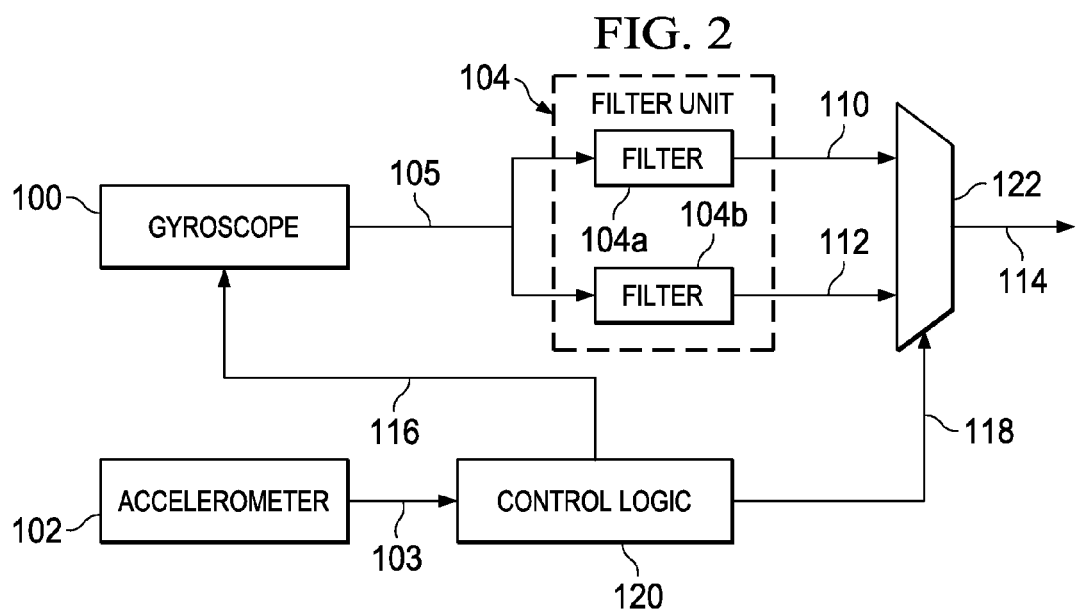
FIG. 2 shows a system embodiment in which the filter unit comprises multiple filters.

In some embodiments, the filter unit 104 is packaged separately from the gyroscope 100, while in other embodiments, the filter unit 104 is packaged with the gyroscope 100. Further, the filter unit 104 may comprise a single filter programmable by the control logic 120, or multiple filters individually selected by the control logic. FIGS. 2 and 3 illustrate such embodiments.

In FIG. 2, the filter unit 104 comprises two filters 104a and 104b, although any number of filters can be included. Each filter 104a, 104b receives the gyroscope signal 105 and filters that signal according to the frequency response implemented in each filter. The filters 104a, 104b preferably are configured for different cut-off frequency—one filter's cut-off frequency being higher than the other. The filtered output signals 110, 112 from the filters 104a, 104b are provided to a multiplexer 122 which causes only one of the output signals 110, 112 to be selected per a control signal 118 from the control logic 120. Thus, the control logic 120, based on the accelerometer signal 103 or some metric derived from the accelerometer signal, determines which of the filters 104a, 104b to use and generates the control signal 118 to cause the desired filter's output to be selected.

In FIG. 3, the filter unit 104 also comprises two filters 104a and 104b and, as in FIG. 2, the control logic 120 also determines which of the two filters to use based on the accelerometer signal 103. In the embodiment of FIG. 3, however, the control logic generates control signals 126 and 128 to filters 104a and 104b, respectively. Each control signal 126, 128 is an enable/disable signal for the corresponding filter. Via the control signals 126, 128, the control logic 120 can enable filter 104a while disabling filter 104b, or vice versa. A filter that has been disabled is powered off while a filter that is enabled is powered on.

In accordance with some embodiments, the gyroscope 100 comprises a single axis gyroscope while in other embodiments, the gyroscope 100 comprises a multi-axis gyroscope. For example, the gyroscope 100 in some embodiments comprises a 3-axis gyroscope. Similar, in some embodiments, the accelerometer 102 comprises a single axis accelerometer while in other embodiments, the accelerometer 102 comprises a multi-axis accelerometer. For example, the accelerometer in some embodiments comprises a 3-axis accelerometer. Preferably, the accelerometer and gyroscope have the same number of axes. That is, if the gyroscope 100 is a 3-axis device than the accelerometer 102 also is a 3-axis device.

FIG. 4 illustrates an embodiment in which each of the gyroscope 100 and accelerometer 102 comprise 3-axis devices. The three axes are x, y, and z. The accelerometer signals thus are designated as Ax, Ay, and Az for the x, y, and z axis signals generated by the accelerometer 102. Similarly, the gyroscope signals are designated as Gx, Gy, and Gz for the x, y, and z axis signals generated by the gyroscope 100.

In the embodiment of FIG. 4, one or more filters are included to filter each of the three gyroscope signals Gx, Gy, and Gz. Filter 130 filters gyroscope output signal Gx, while filters 132 and 134 filter gyroscope output signals Gy and Gz, respectively. Each gyroscope filter for each of the three gyroscope axes may comprise a single programmable filter or may comprise multiple, selectable filters as in the embodiments of FIGS. 3 and 4. The control logic 120 receives the three accelerometer signals Ax 142, Ay 144, and Az 146 and, based on one or more of the accelerometer signals or a metric derived from the accelerometer signals, configures one or more of the filters 130, 132, and 134 for filtering the gyroscope signals Gx, Gy, and Gz. The three filters 130, 132, and 134 in FIG. 4 can be individually configured by way of control signals 152, 154, and 156 from the control logic 120. Each control signal 152, 154, 156 may select a desired filter as in the embodiment of FIG. 2 or may enable/disable a desired filter as in the embodiment of FIG. 3.

In some embodiments, each axis of the accelerometer can be used to control the bandwidth of an axis of the gyroscope independently. Assuming the three axes of the accelerometer and gyroscope are aligned in the same direction, if acceleration (besides gravity) on a particular axis (e.g., x-axis) is detected (e.g., greater than a threshold), then the bandwidth of the gyroscope filter on a particular axis (e.g., y- or z-axis) is adjusted accordingly (e.g., increased to a greater bandwidth setting).

In some embodiments, the metrics noted above are computed separately for each accelerometer axis. The metrics for the x, y, and z axes may be designated as Mx, My, and Mz and computed as follows:

$$Mx=\text{var}(Ay)+\text{var}(Az)$$

$$My=\text{var}(Ax)+\text{var}(Az)$$

$$Mz=\text{var}(Ax)+\text{var}(Ay)$$

Once these metrics are computed, the bandwidth for each of the gyroscope axis filters 130-134 are determined. For example, if Mx is greater than a threshold, then the bandwidth of filter 130 on Gx is set to a higher level, and otherwise set to a lower level.

The embodiment of FIG. 5 is similar to that of FIG. 4 except that a single control signal 162 is generated by the control logic 120 based on one or more of the accelerometer signals. Thus, the single control signal 162 configures each of the filters 130, 132, and 134 in a similar fashion. For example, each filter 130-134 may be configured for a higher bandwidth based on the control signal 162, or each filter may be configured for a higher bandwidth based on a different state of the control signal 162.

Figure 6:
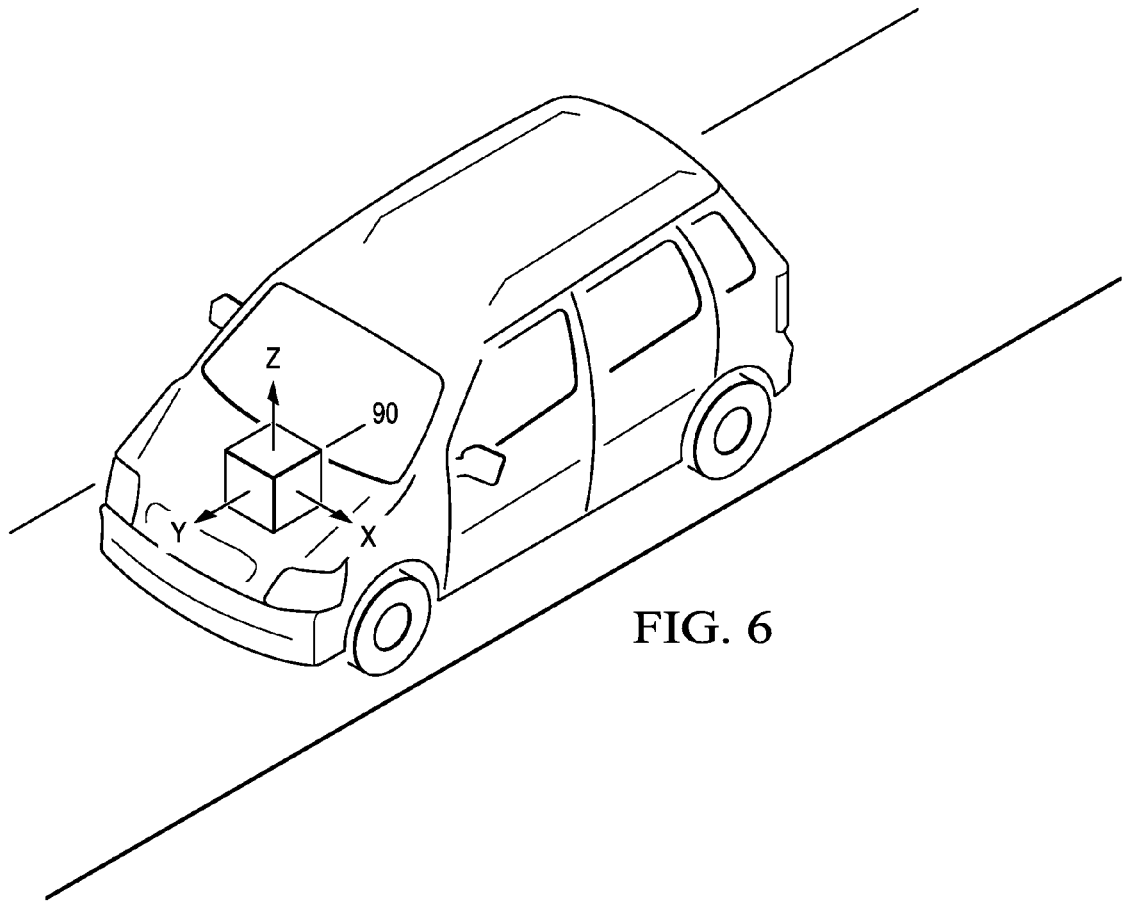
FIG. 6 depicts a vehicle containing the inertial navigation system in accordance with the preferred embodiments.
Figure 7A:
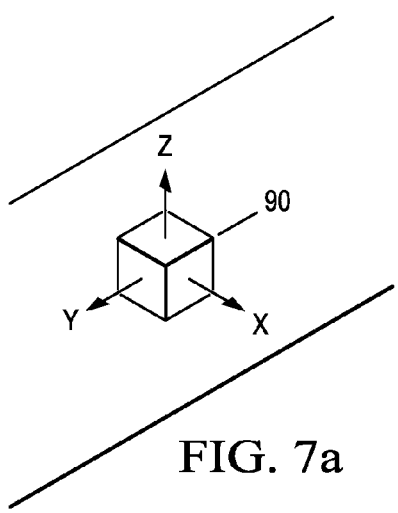
FIGS. 7a and 7b depict different orientations of the inertial navigation system.
Figure 7B:
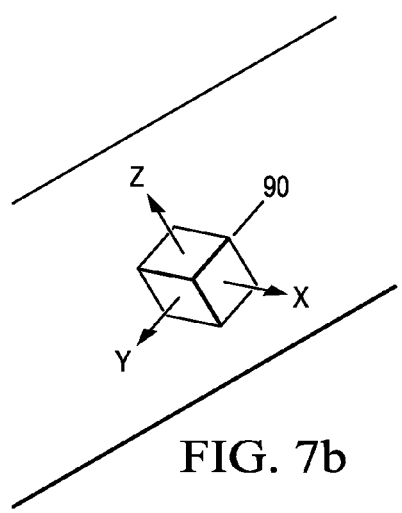

In some embodiments, the inertial navigation system 90 (e.g., gyroscope 100, accelerometer 102, filter unit 104, and/or control logic 120) is contained within a larger system whose orientation with respect to the ground is known. For example, an vehicle (e.g., a car, a truck, etc.) may include a system 90 mounted to the vehicle. The orientation of the system 90 is fixed relative to the vehicle and the vehicle's orientation remains constant (level to the ground). Thus, the orientation of the system 90 is fixed relative to the ground. FIG. 6 illustrates a vehicle 210 in which an inertial navigation system 90 is mounted. As explained above, the multi-axis gyroscope and accelerometer in the inertial navigation system 90 are sensitive to motion in the x, y, and z axes. FIGS. 7a and 7b illustrate a road (ground) and an inertial navigation system 90 with a fixed orientation respect to the road (the depiction of the vehicle in FIGS. 7a and 7b has been eliminated for simplicity). In FIG. 7a, the inertial navigation system 90 is mounted flat with respect to the road so that y axis points in the direction of the road, the x-axis points perpendicular to the direction of the road and the z-axis is up/down with respect to the road.

In the example of FIG. 7b, however, the inertial navigation system 90 is mounted at an angle with respect to the road so that its x-, y-, and z-axes (solid arrows) of the inertial navigation system do not point forward/back, lateral, and vertically with respect to the road. In this embodiment, however, the x, y, and z axis signals from the accelerometer and gyroscope can be transformed to any desired frame of reference, such as the car's or road's frame of reference (x, y, and z axes designated by the dashed arrows).

In embodiments such as vehicle mounted navigation system, the gyroscope 100 generates signals while the vehicle is turning. Such signals may be most pronounced in the lateral direction with respect to the road. The lateral direction is along the x-axis in FIG. 7a. In FIG. 7b, the x-axis of the inertial navigation system 90 (solid arrow) is transformed to align with the road's lateral/x-axis (dashed arrow).

The control logic 120 configures the filter unit 104 based on the lateral accelerometer signal (e.g., lateral with respect to the road) and transforms an axis signal from the accelerometer to align with the lateral direction with respect to the road. Based on whether that accelerometer signal has an amplitude greater than a predetermined threshold, the control logic 120 configures the filter unit.

Further still, a vehicle may go up a ramp in which case the accelerometer's vertical z-axis signal is incorporated into the control of the frequency response of the filter unit 104. In general, any one or more of the x, y, and z axis signals from the accelerometer can be used to (with or without transformation) trigger a change by the control logic 120 in the frequency response of the filter unit.

In some embodiments, the system 90 (e.g., gyroscope 100, accelerometer 102, filter unit 104, and/or control logic 120) is contained within a handheld device such as a personal digital assistant (PDA), smart phone, and the like. The orientation of such a device with respect to the ground naturally can vary depending on how a person is holding the device. Thus, the orientation of the device, and the system 90 contained therein, is not fixed. In such embodiments (orientation of system 90 not known), the control logic 120 computes a metric (M) based on the accelerometer signal, be it a single signal or a set of multi-axis signals. In one embodiment, the control logic 120 computes metric M in a way that separates the acceleration due to movement of a system containing the gyroscope and accelerometer from the acceleration due to gravity. Several techniques are possible to compute M so as to remove the acceleration due to gravity. For instance, M can be computed in any one of the following ways:

$$M=\sqrt{(Ax^2+Ay^2+Az^2)}-G \quad \text{(Eq. 1)}$$

where G is the gravitational constant. In equation 1, the metric comprises computing the square root of a value based on the acceleration signals (e.g., the sum of the square of acceleration signals) less the gravitational constant.

$$M=\max(\text{std}(Ax), \text{std}(Ay), \text{std}(Ay)) \quad \text{(Eq. 2)}$$

where "std( )" is the standard deviation computed over some number of samples. The "max( )" function means to select the maximum of the three arguments std(Ax), std(Ay), and std(Az). The maximum of the three arguments is the metric M.

$$M=\sqrt{\text{var}(Ax)+\text{var}(Ay)+\text{var}(Az)} \quad \text{(Eq. 3)}$$

where "var( )" is the variance computed over a predetermined number of samples.

Figure 8:
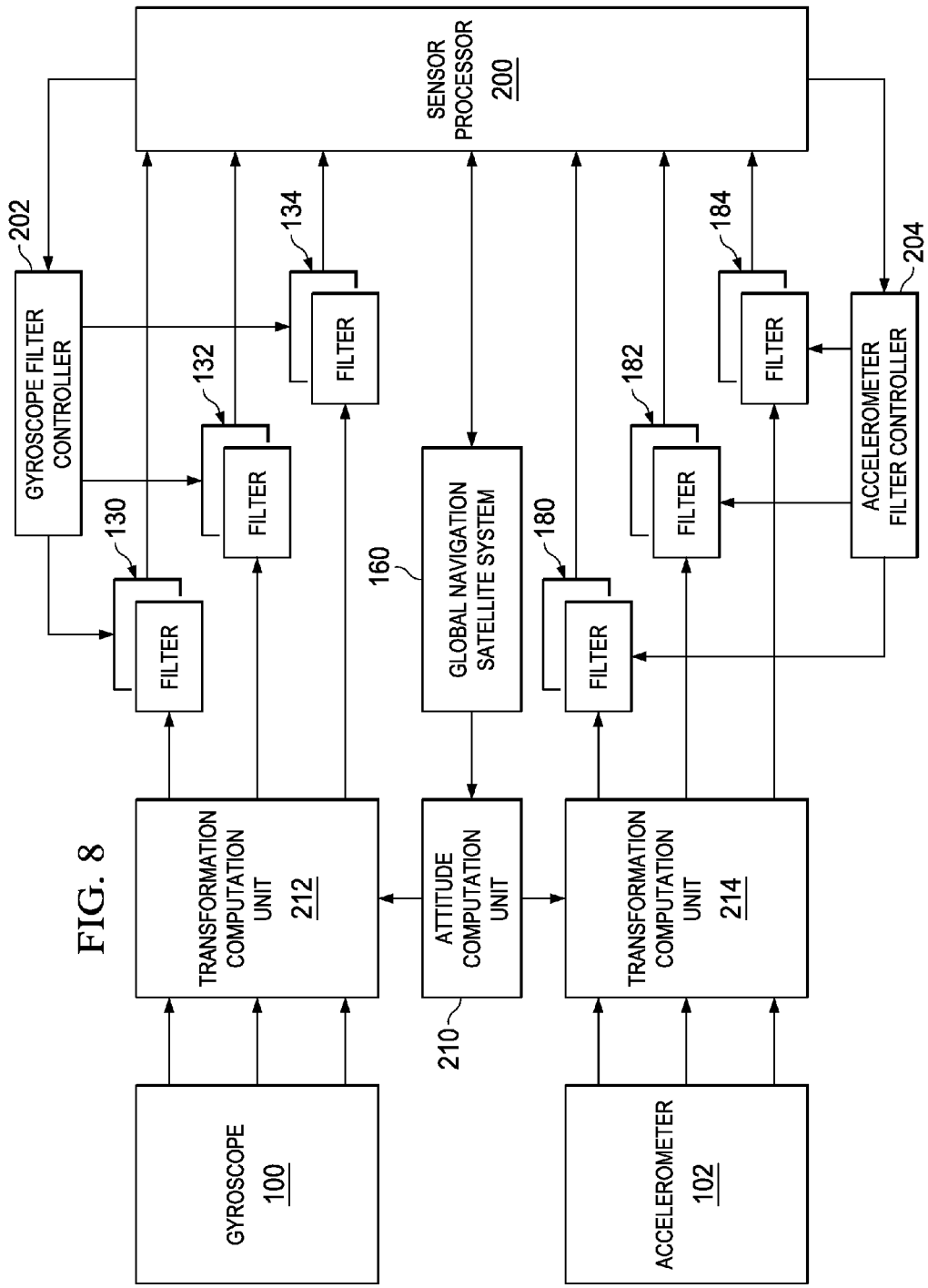
FIG. 8 shows yet another system in accordance with various embodiments.

FIG. 8 shows another embodiment of the invention. In this embodiment, in addition to gyroscope filter 130-134, accelerometer filters 180, 182, and 184 are provided as well to filter each of the accelerometer signals. Further, the control logic 120 of the previous embodiments comprises the sensor processor 200, the gyroscope filter controller 202, and the accelerometer filter controller 204 in the embodiment of FIG. 8. The system also comprises a global navigation satellite system (GNSS) 160 coupled to an attitude computation unit 210. The GNSS comprises any type of satellite-based navigation system (e.g., Global Positioning System). The attitude computation unit 210 determines the attitude of the inertial navigation system. For each of the gyroscope 100 and accelerometer 102, a transformation computation unit 212 and 214, respectively, is provided to transform the gyroscope's and accelerometer's output signals to a desired frame of reference. The sensor processor 200 receives the transformed and filtered signals from the gyroscope 100 and accelerometer 102 and generates signals for the filter controllers 202 and 204 to cause the filter controllers to adjust the frequency response of any or more of the filters 130-134 and 180-184.

Figure 9:
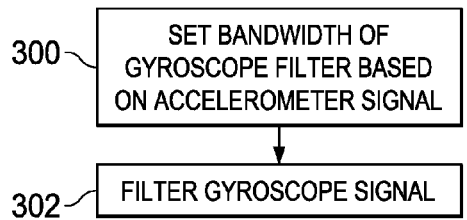
FIG. 9 shows a method in accordance with various embodiments.

FIG. 9 shows a method usable in accordance with the systems described herein. At 300, the method comprises setting the bandwidth of a gyroscope filter based on an accelerometer signal as described above. At 304, the method comprises filtering a gyroscope signal based on the newly set bandwidth.

Figure 10:
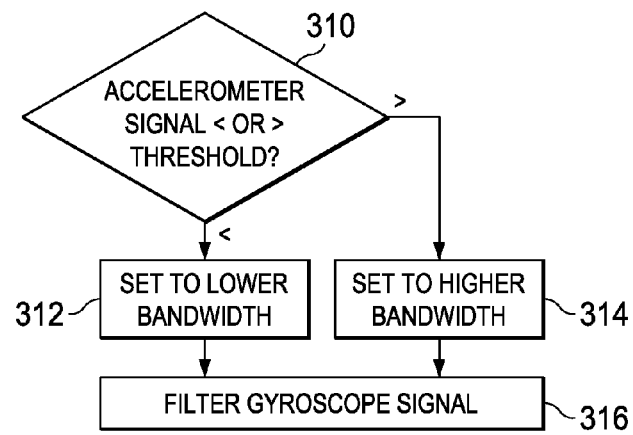
FIG. 10 shows another method in accordance with various embodiments.

FIG. 10 shows another method. At 310, the method comprises determining whether the accelerometer signal is less than or greater than a threshold value (which is at least one way to implement action 300 from FIG. 9). If the accelerometer signal is less than the threshold, then at 312, the method comprises setting the bandwidth of the gyroscope's filter(s) to a lower setting. If, however, the accelerometer signal is greater than the threshold, then at 314, the method comprises setting the bandwidth of the gyroscope's filter(s) to a higher setting. At 316, the gyroscope signal is filtered in accordance with the bandwidth set at 312, 314.

Figure 11:
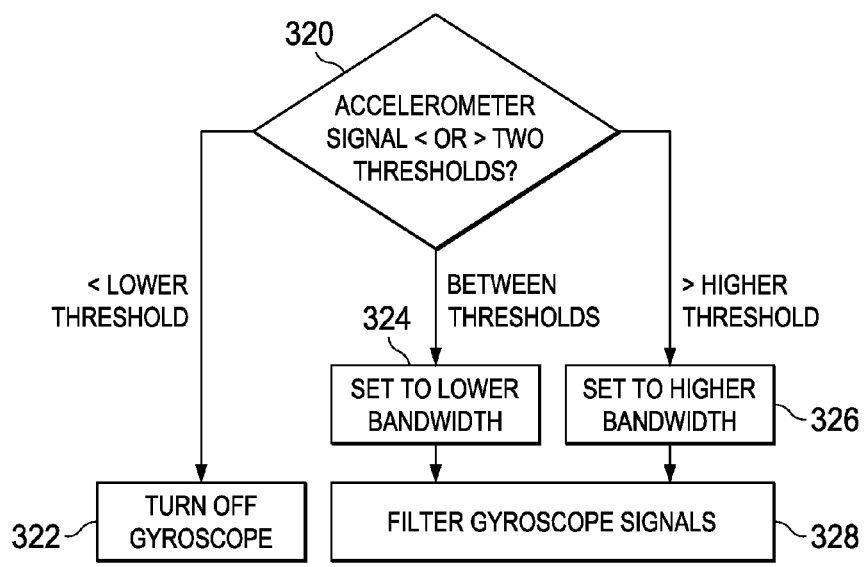
FIG. 11 shows a method embodiment in which the gyroscope is turned off based on an accelerometer signal.

FIG. 11 provides yet another method. Actions 318, 320, 324 and 326 in FIG. 11 implement action 300 in FIG. 9. At 318, the method of FIG. 11 comprises comparing the accelerometer signal to two thresholds—an upper threshold and a lower threshold. At 320, the method comprises determining whether the accelerometer signal is less than a lower threshold, greater than an upper threshold, or between the lower and upper threshold. If the accelerometer signal is less than the lower threshold, then at 322, the method comprises turning off the gyroscope 100. The lower threshold preferably is low enough that any acceleration signals lower than that value indicates that the system containing the inertial navigation system is either not moving or moving in a straight line with a constant velocity. In this case, the gyroscope, which is not sensitive to such the lack of motion or constant velocity, straight line motion, can be transitioned to a low power, off, or sleep mode.

If, however, the accelerometer signal is between the lower and upper thresholds, the method comprises at 324 setting the bandwidth of the gyroscope's filter(s) to a lower setting. If, however, the accelerometer signal is greater than the upper threshold, then at 326, the method comprises setting the bandwidth of the gyroscope's filter(s) to a higher setting. At 328, the gyroscope signal is filtered in accordance with the bandwidth set at 324, 326.

In yet other embodiments, the output signals from the gyroscope 100 and accelerometer 102 are buffered in, for example, the control logic 120. FIG. 1, for example, shows a buffer 121 in the control logic 120. Then, as the accelerometer signal is processed and described above and the control logic determines that user dynamics have changed to the point that a change in the gyroscope's filter(s) is warranted, the change in the filter is made but applied to the buffered gyroscope data. This embodiment thereby provides a way to overcome any delay there may be in detecting user acceleration. Essentially, the gyroscope's filters filter previously acquired and buffered gyroscope data thereby giving the control logic 120 sufficient time to detect changes in acceleration and reconfigure the bandwidth of the appropriate filters.

Various metrics are provided above based on the accelerometer signals for determining how to alter the bandwidth of the gyroscope filters. The metric may be any desired function based on the accelerometer signals. For example, the metric may comprise a function suitable for detecting that a user carrying the inertial navigation system 90 is walking, jogging, running, etc. In some embodiments, a pedometer (which may contain the accelerometer) may provide an output signal indicating the user is walking, and that signal can be used by the control logic 120 to alter the filter's bandwidth.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A system, comprising:
a gyroscope configured to produce a gyroscope signal;
a low-pass filter unit coupled to said gyroscope and having a configurable bandwidth, said filter unit configured to low-pass filter the gyroscope signal; and
control logic coupled to said filter unit and configured to alter the bandwidth of the low-pass filter unit based on an accelerometer signal by:
computing a metric based on the accelerometer signal to remove an acceleration due to gravity;
comparing of the metric to a threshold;
setting a bandwidth of the low-pass filter unit based on an accelerometer signal and the computed metric;
wherein computing the metric comprising:
squaring the acceleration signal for each axis;
summing the squares of the acceleration signals;
taking a square root of the sum; and
subtracting a gravitational constant; and,
wherein computing the metric M uses the equation $$M=\sqrt{\mathrm{var}(Ax)+\mathrm{var}(Ay)+\mathrm{var}(Az)}$$

where "var( )" is a variance computed over a predetermined number of samples.

2. The system of claim 1 wherein the gyroscope comprises a multi-axis gyroscope and said gyroscope signal comprises a separate, single axis gyroscope signal corresponding to each axis of the gyroscope, and said low-pass filter unit comprises a separate filter corresponding to each single axis gyroscope signal, each of said separate filters having a bandwidth configurable by the control logic based on the accelerometer signal.

3. The system of claim 1 wherein said control logic is configured to assert a signal, based on the accelerometer signal, to said gyroscope to cause the gyroscope to transition to a low power state comprising at least one of an off state and a sleep mode.

4. The system of claim 1 wherein, the control logic alters the bandwidth of the filter unit for a first bandwidth based on the accelerometer signal being above a first threshold and alters the bandwidth of the low-pass filter unit for a second bandwidth based on the accelerometer signal being below the first threshold but above a second threshold, and the control logic asserts a disable signal to the gyroscope based on the accelerometer signal being below the second threshold, said disable signal causing the gyroscope to power off or transition to a low power or sleep mode.

5. The system of claim 1 further comprising a buffer into which the gyroscope signal is stored and said low-pass filter unit retrieves and then filters the gyroscope signal from the buffer.

6. The system of claim 1 wherein said low-pass filter unit comprises a plurality of filters.

7. The system of claim 1 wherein computing the metric M uses the equation $$M=\max(\mathrm{std}(Ax), \mathrm{std}(Ay), \mathrm{std}(Ay))$$

where std( ) is a standard deviation computed over a number of samples, max( ) function means to select a maximum of a set of the standard deviation of the number of samples.

\* \* \* \* \*